Dec. 21, 1937.   R. B. EVANS ET AL   2,103,001
WINDSHIELD WIPER MECHANISM
Filed Aug. 28, 1933   2 Sheets-Sheet 1
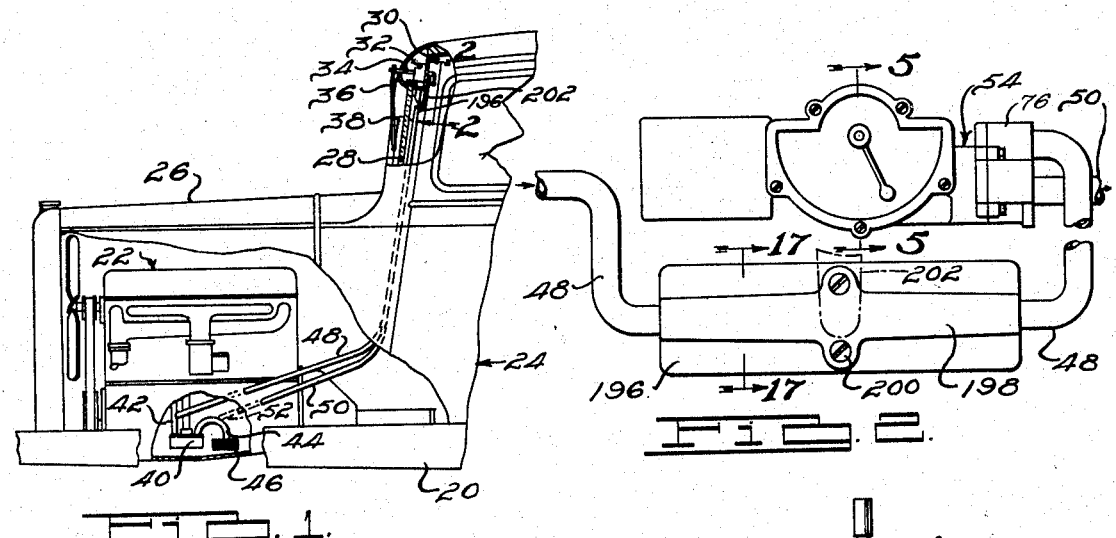
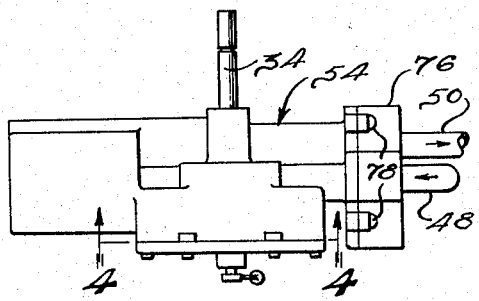
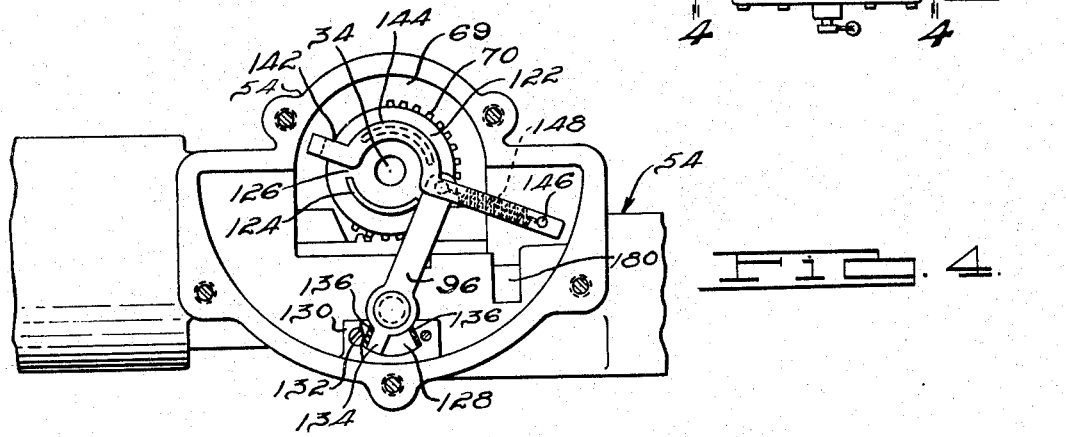
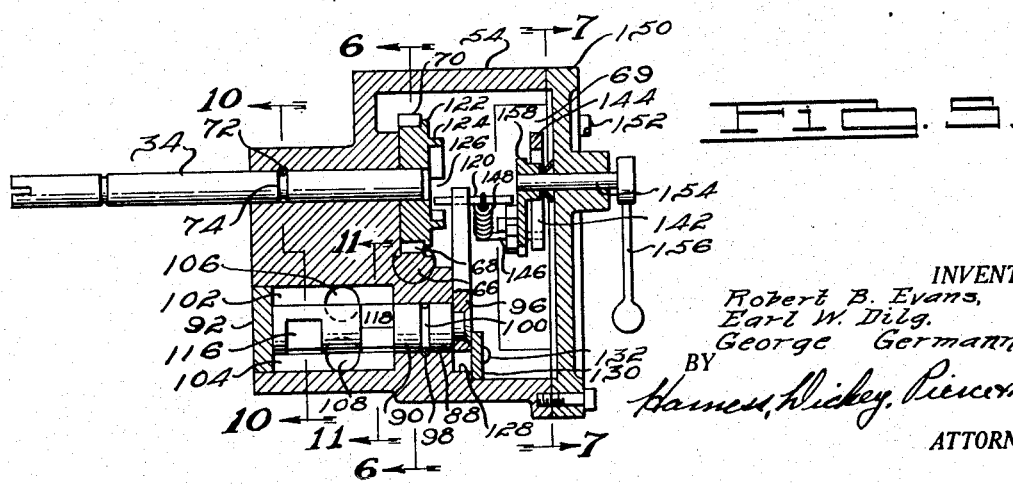
INVENTORS.
Robert B. Evans,
Earl W. Dilg.
George Germann.
BY
Harness, Dickey, Pierce & Hann.
ATTORNEYS.

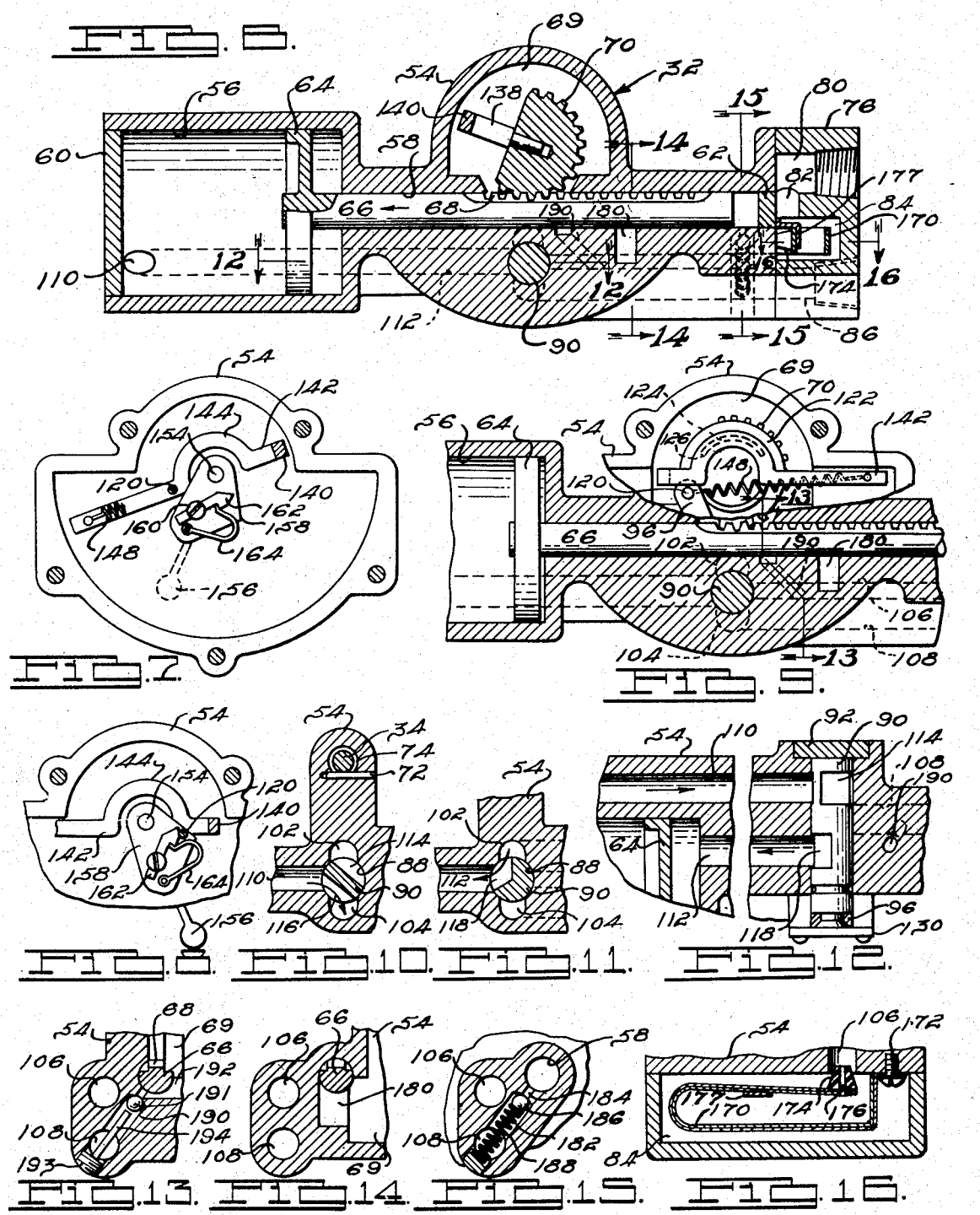

Patented Dec. 21, 1937

2,103,001

UNITED STATES PATENT OFFICE 2,103,001

WINDSHIELD WIPER MECHANISM

Robert B. Evans, Grosse Pointe, and Earl W. Dilg and George Germann, Detroit, Mich., assignors to E. S. Evans and Sons, Detroit, Mich., a corporation of Michigan Application August 28, 1933, Serial No. 687,062

26 Claims. (Cl. 121—164)

This invention relates to windshield wipers, the principal object being the provision of an improved motor a device of this type that is simple in construction, efficient in operation and economical to produce.

Other objects include the provision of a windshield wiper motor that is noiseless in operation, of extremely long life, and which will have a substantially constant speed of operation during normal driving speed of a motor vehicle upon which it is mounted.

Other objects include the provision of a windshield wiper motor operated by a liquid medium under pressure; the provision of a windshield wiper motor which may be conveniently connected to the lubrication system of an internal combustion engine so as to receive its source of power from the lubricant under pressure therein; the provision of a windshield wiper motor driven by a liquid medium and in which the possibility of leakage of the liquid medium from the wiper motor is substantially eliminated; the provision of a windshield wiper motor driven by a liquid medium and not requiring the use of packed joints to prevent the leakage of the liquid medium therefrom; the provision of a windshield wiper motor driven by a liquid medium and in which the liquid medium is employed both as a medium to cause operation thereof and as a medium to cushion the movement of parts therein to render the operation noiseless; the provision of a windshield wiper motor having a dash pot associated with one or more parts thereof to cushion the operating movements thereof; the provision of a liquid operated windshield wiper motor having a novel means for discharging any liquid that may internally leak past parts thereof to a suitable point of deposit; and the provision of a windshield wiper operated by a liquid medium having a novel means for returning accumulated liquid leakage within it to a suitable point of deposit during inoperative periods of the wiper.

Other objects include the provision of a novel valve operating means; the provision of a simple and effective means for alternately moving a valve from one position to another; the provision of a novel valve operating means for alternately moving a valve between two positions including an oscillatable cam of circular formation and a valve operating arm having a portion thereof adapted to engage the cam, the cam being provided with a path thereacross through which said projection is movable when aligned therewith, together with means for alternately moving the valve operating arm in opposite directions of movement; and the provision of novel means for causing the wiper arm of a windshield wiper to be moved to a predetermined position during non-operative periods of operation thereof.

Other objects include the provision of a windshield wiper motor including a body having a separable housing removably secured thereto, the tube or tubes for conveying the fluid operating medium to and/or from the wiper being secured to the housing so that when it is necessary to remove the wiper for the purpose of repairs or the like, the housing and its connection with the tube may remain in place and intact.

Other objects include the provision of a windshield wiper motor operated by a lubricant under pressure from the lubricant system of an internal combustion engine and having thermostatically operated means for varying the volume of lubricant to the wiper motor.

Other objects include the provision of a windshield wiper motor including a single reciprocable piston; the provision of a windshield wiper motor operated by a liquid medium and including a housing providing the cylinder in which a piston is movable, the piston being provided with a rod having a free end and the housing being so formed with respect to said free end as to provide a second cylinder and piston assembly, the second cylinder and piston assembly being provided with suitable valvular means for the purpose of discharging leakage of operating liquid interiorly of the wiper motor therefrom.

Further objects include the provision, in combination with a windshield wiper motor operated by a lubricant from the lubrication system of an internal combustion engine, of means for transferring heat from the lubricant employed to operate the wiper motor to a portion of the windshield of the motor vehicle of which it forms a part.

The above being among the objects of the present invention, the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a more or less diagrammatic, partially broken, partially sectioned side elevation of a motor vehicle showing a windshield wiper mounted in the conventional location thereof and connected with the lubrication system of the internal combustion engine power plant for the motor vehicle.

Fig. 2 is an enlarged, partially broken elevational view of the face of the windshield wiper motor and windshield warming attachment shown mounted on the motor vehicle in Fig. 1 and looking from the rear of the vehicle as on the line 2—2 of Fig. 1.

Fig. 3 is a top plan view of the windshield wiper motor shown in Fig. 2.

Fig. 4 is an enlarged, fragmentary, partially broken, partially sectioned view taken on the line 4—4 of Fig. 3, that is, with the face cover removed and illustrating the enclosed mechanism in one of its working positions.

Fig. 5 is an enlarged, vertical, transverse sectional view taken on the line 5—5 of Fig. 2.

Fig. 6 is a vertical sectional view taken longitudinally through the windshield wiper motor as on the line 6—6 of Fig. 5.

Fig. 7 is a vertical sectional view taken on the line 7—7 of Fig. 5 and illustrating the mechanism for manually controlling the operation of the wiper motor, the mechanism being shown in a position to permit operation of the wiper.

Fig. 8 is a fragmentary view of the mechanism shown in Fig. 7 and illustrating the manually operable mechanism moved to a position to prevent operation of the wiper.

Fig. 9 is a fragmentary, partially broken view partially sectioned in the same plane as Fig. 6 and illustrating the mechanism in non-operating position.

Fig. 10 is a fragmentary, vertical sectional view through the operating valve taken on the line 10—10 of Fig. 5.

Fig. 11 is a view similar to Fig. 10 but taken on the line 11—11 of Fig. 5.

Fig. 12 is a fragmentary, broken, horizontal sectional view through the valve mechanism taken on the line 12—12 of Fig. 6.

Fig. 13 is a fragmentary transverse vertical view taken on the line 13—13 of Fig. 9 and illustrating the drainage passage for exhausting leakage from the wiper motor when the wiper is in inoperative position.

Fig. 14 is a transverse vertical sectional view taken on the line 14—14 of Fig. 6.

Fig. 15 is a transverse vertical sectional view taken on the line 15—15 of Fig. 6.

Fig. 16 is a horizontal sectional view taken on the line 16—16 of Fig. 6, the view being rotated through 90 degrees from the position of parts shown in Fig. 6.

Fig. 17 is a vertical sectional view taken transversely through the windshield warming device as on the line 17—17 of Fig. 2.

The windshield wiper motor embodying the present invention and illustrated in the accompanying drawings is capable of being operated by any suitable fluid under pressure, or by suction upon reversal of the valves as will be obvious to those skilled in the art. However, in view of the fact that windshield wipers are usually employed in combination with a motor vehicle provided with an internal combustion engine power plant having a pressure lubricating system, it is deemed desirable to employ lubricant under pressure from such lubricating system as a source of power for the reason that by its use lubrication of the various moving parts of the wiper motor mechanism is automatically obtained, thus assuring a maximum life for the wiper motor, operating noises are substantially eliminated, and it is possible to obtain a substantially constant stroke of the wiper arm, as well as other advantages which will hereinafter be pointed out or will be apparent. Accordingly, the embodiment of the invention shown in the accompanying drawings will be considered and is shown as being driven by lubricating oil under pressure from the pressure lubrication system of an internal combustion engine. It is to be understood, however, that many of the inventive features of the wiper motor herein shown and described are capable of being employed on windshield wipers of different construction and/or driven by a different motive fluid and, accordingly, in the appended claims, except where otherwise specifically limited, such claims are not to be considered as limiting the use of any such features to the specific structure shown and described and/or a structure employing the same motive fluid.

Referring to the accompanying drawings, in Fig. 1 is illustrated a motor vehicle having a frame 20 upon which is mounted an internal combustion engine indicated generally as at 22, and a vehicle body indicated generally as at 24 including a hood 26 concealing the engine 22. The vehicle body 24 includes a windshield 28 of conventional construction and windshield header 30. Suitably mounted upon the windshield header 30 is a windshield cleaner motor indicated generally as at 32, preferably concealed within the header 30 and including an operating shaft 34 to which is suitably secured a wiper arm 36 carrying at its lower end a wiper blade 38 adapted to be oscillated across the outer face of the windshield 28 in the usual manner. The engine 22 is provided with a suitably driven oil pump 40 of any conventional construction having a discharge pipe or passage 42 and an intake pipe or passage 44, the latter preferably being provided with a filtering screen 46 in accordance with conventional practice. As illustrated in Fig. 1, a tube 48 connects the windshield wiper 32 with the outlet passage 42 of the oil pump 40 and the second tube 50 connected with the windshield wiper 32 extends into the lower part of the crankcase of the engine 22 in order to discharge the motive fluid from the wiper 32 thereinto, although in some instances, as will later be more clearly brought out, the tube 50 may be extended, as indicated at 52 by dotted lines, to connect it with the intake passage 44 for the oil pump 40.

Referring to the remaining figures in the drawings and particularly to Fig. 6, it will be noted that the windshield wiper motor includes a main body 54 shown as of cast construction, one end of which is formed to provide an operating cylinder 56, and having a connecting longitudinally extending concentric bore 58. One end of the cylinder 56 is closed by a plug 60 and the opposite end of the bore 58 is closed by a plug 62. Within the cylinder 56 is received a piston 64 provided with a piston rod 66, shown as formed integrally therewith, which is relatively closely received in the bore 58 and so, as will hereinafter be more clearly brought out, its right hand end, as viewed in Fig. 6, may act as a piston therein. The piston rod 66 intermediate its end is formed to provide an upwardly facing gear rack 68.

As best indicated in Fig. 5, the operating shaft 34 of the windshield wiper motor is provided with suitable bearing in the housing 54 above and in perpendicular relation with respect to the axis of the piston rod 66 and within the hollow interior central pocket 69 formed in the body 54 is provided with a gear segment 70 in mesh with the rack 68, so that upon reciprocation of the piston rod 66 and rack 68 oscillation of the shaft 34 will occur. As indicated in Figs. 5 and 10, axial movement of the shaft 34 is prevented by a pin 72 secured in the body 54 in transverse relation to the axis of the shaft 34 and intersecting a groove 74 formed in the surface thereof.

In order to carry lubricating oil to and from the engine 22 to the windshield wiper motor, there is secured to the right hand end of the body 54, as viewed in the figures, a small housing 76 as by means of screws 78 (see Fig. 3). The housing 76 is provided with a passage 80 into which the lubricant feed pipe 48 is adapted to be threaded, the passage 80 communicating through a smaller vertically extending passage 82 with a pocket 84 formed in the intermediate portion of the housing 76 and below the passage 80. As also indicated in Fig. 6, the housing 76 is provided with another passage 86 therein into which the end of the discharge tube 50 is adapted to be threaded.

The body 54 below the piston rod 66 is provided with a cylindrical bore 88 in axially parallel relation with respect to the shaft 34 in which a cylindrical valve 90 is rotatably mounted. The front, or left hand end of the bore 88 as viewed in Fig. 5, is sealed by a plug 92 against which the forward end of the valve 90 abuts, and the rear end of the valve 90 projects into the pocket 69 and fixed to the projecting end of the valve 90 within the pocket 69 is an upwardly projecting arm 96. A pin 98 engaging a groove 100 in the valve member 90 in a manner similar to the pin 72 previously described, maintains the valve member 90 against axial displacement.

As best indicated in Figs. 5, 10 and 11, the bore 88 above and below the forward portion of the valve 90 is provided with upper and lower opposed axially extending grooves 102 and 104 respectively. The upper groove 102 is connected by a passage 106 with the pocket 84 in the housing 76, and the lower groove 104 is connected by a passage 108 with the passage 86 in the housing 76. A pair of passages 110 and 112, as best indicated in Figs. 10, 11 and 12, connect the bore 88 intermediate the grooves 102 and 104 with respectively opposite ends of the cylinder 56.

As best illustrated in Figs. 5, 10, 11 and 12, the valve 90 in line with the passage 110 is provided on diametrically opposite sides with notches 114 and 116. As will be apparent from an inspection of Fig. 10, by suitably rotating the valve 90 the passage 110 may be made to communicate with either the groove 102 through the notch 114 or with the groove 104 through the notch 116. In line with the passage 112 the valve 90 is provided with a notch 118 and, as will be apparent from an inspection of Fig. 11, by suitably rotating the valve 90 the passage 112 may be made to communicate with either the groove 102 or the groove 104 through the notch 118. The notches 114 and 116 are so positioned with respect to the notch 118 that when the notch 118 communicates the passageway 112 with the groove 102 the groove 116 communicates the passageway 110 with the groove 104. In this position of parts oil under pressure will be fed through the passageway 106 to the groove 102 and thence to the inner face of the piston 64 through the notch 118 and passage 112, while the outer end of the cylinder 56 will be in communication through the passage 110, notch 116 and groove 104 with the discharge passage 108. This is the position that the valve will assume when the piston is in the position indicated in Fig. 6. Obviously, when the piston 64 reaches the outer end of its stroke, or to the left as viewed in Fig. 6, the valve 90 will be operated so that the passage 110 will be communicated through the notch 114 and groove 102 with the passage 106 containing the lubricating oil under pressure and the passage 112 will be communicated through the notch 118 and groove 104 with the discharge passage 108. From the above it will be apparent that upon suitable oscillation of the valve 90 opposite ends of the cylinder 56 may be alternately connected with the pressure and discharge passages of the wiper motor to effect continuous operation thereof.

In order to effect oscillation of the valve 90 in timed relation with the reciprocable position of the piston 64, the following mechanism is provided. As perhaps best indicated in Fig. 5, the upper end of the arm 96 secured to the valve 90 is provided with a pin 120 projecting transversely thereof in parallelism with the axis of the operating shaft 34 and in a position such that its forward end extends into proximity with respect to the face of the gear segment 70 so that it may sweep thereacross during oscillation of the arm 96. The face of the gear segment 70 is provided with a circular plate 122, shown in the drawings as being formed integrally therewith, and fixed concentrically to the face of the disc 122 is an annular cam 124 which is cut out or notched at diametrically opposite areas as at 126. The cam 124 projects out into the path of movement of the forward end of the pin 120 and the notches 126 are of sufficient depth that when properly positioned the pin 120 may move completely across the face of the disc 122 through the cam 124 by passing through the notches 126.

Below the pivotal point of the arm 96 the body 54 is formed to provide a small pocket 128 auxiliary to the pocket 69, the face side of which is normally enclosed by a plate 130 secured in place by screws 132, the edges of the pocket extending into sealing relation with respect to the hub of the arm 96. The lower end of the arm 96 is provided with a downwardly extending projection or extension 134 which cooperates with the side and bottom walls of the pocket 128 to provide an oscillating piston therein. Contact of the extension 134 of the arm 96 with the end walls of the pocket 128 serves to limit the angular movement of the arm 96 in opposite directions, which is such that the pin 120 has moved just beyond the periphery of the cam 124. As will hereinafter be explained, oil which collects in the pocket 69 tends to fill the pocket 128 and displacement of such oil by oscillation of the extension 134 in the pocket tends to cushion the movement of the arm 96 at the limit of its movement in opposite directions and therefore prevents any audible sensation of the arm 96 reaching the limit of its movement by contact of the extension 134 with the end walls of the pocket 128. If desired, non-metallic members 136, as indicated in Fig. 4, may be inserted in the ends of the pocket 128 to further quiet any noise that might otherwise be occasioned by contact of the extension 134 with the end walls of the pocket 128.

As indicated best in Figs. 4, 5 and 6, a radially extending post 138 is fixed to the flat side of the gear segment 70 and extends radially outwardly to a point beyond the periphery of the disc 122 where it is fixed to a rearwardly extending post portion 140 which extends rearwardly to a point adjacent to the rear face of the body 54. The rear end of the portion 140 is fixed to an arm 142 which extends radially of the disc 122 to a point materially beyond the diametrically opposite edge thereof. The central portion 144 of the arm 142 is curved concentrically with respect to the axis of the disc 122 and shaft 34 for the purpose of providing clearance for parts to be hereinafter described. The free end of the arm 142 is provided with a forwardly extending pin 146 between which and the rearwardly extending end of the pin 120, a coil spring 148 is tensioned. With the above described mechanism and considering the various parts of the mechanism as in the positions indicated in Figs. 4, 5 and 6, it will be noted that the spring 148 has drawn the upper end of the arm 96 to the right as viewed in the figures, and the valve 90 has thus been moved to the position indicated in Figs. 10, 11 and 12 so that oil under pressure is being transmitted from the passage 106 to the passage 112 and then to the inner end of the piston 64 while the outer end of the piston 56 is connected by the passage 110 to the discharge passage 108. This oil under pressure will, accordingly, cause the piston 64 to move toward the left, as viewed in Fig. 6, and as the piston 64 moves to the left it will cause the rod 66 and gear rack 68 to move to the left with it, thus rotating the gear segment 70 with the parts fixed thereto including the arm 142, in a clockwise direction. After a small degree of angular movement of the gear segment 70 in the direction described, the body portion of the cam 124 will move into blocking relation with respect to the forwardly projecting end of the pin 120, and as the arm 142 continues to turn with the gear segment 70 the free end thereof will eventually pass over the longitudinal center line of the arm 96 and will thereafter tend to rotate the arm 96 in a counter-clockwise direction. When this happens the cam 124 will intersect the path of movement of the pin 120 and will prevent the arm 96 from being moved under the increasing influence of the spring 148. However, upon continuing clockwise rotation of the gear segment 70 the free end of the arm 142 will eventually be rotated to the left side of the pocket 69, as viewed in Fig. 4, and at such time the notches 126 in the cam 124 will come into registry with the pin 120, and as soon as this occurs the spring 48 will cause the arm 96 to swing in a counter-clockwise direction, as viewed in Fig. 4, to the opposite limit of its movement, the pin 120 passing through the notches 126 to permit this movement. As soon as this occurs, the valve 90 will be rotated with a more or less snap action so as to reverse the condition indicated in Figs. 10, 11 and 12, in other words, to connect the pressure passage 106 with the outer or left hand of the cylinder 56 and to connect the discharge passage 108 with the inner or right hand end of the cylinder 56. Upon such occurrence the direction of reciprocation of the piston 64 will, of course, be reversed as will the direction of oscillation of the gear segment 70 and the parts fixed thereto, and this movement will continue in a manner similar to that above described until the free end of the arm 142 again reaches the position indicated in Fig. 4 at which time the notches 126 in the cam 124 will permit the pin 120 to again pass through them which will thus permit the spring 148 to return the arm 96 to the position indicated in Fig. 4, at which time the valve 90 will again be moved to the positions indicated in Figs. 10 and 11 and in which positions the piston 64 will again be urged to the left.

Accordingly, from the above it will be apparent that the mechanism herein provided for shifting the valve 90 between opposite limits of its oscillatable movement is positive in operation, includes a minimum number of parts and provides a positive and substantially instantaneous movement of the valve and its arm 96 under the influence of the spring 148. It may also be noted at this point that the piston 64, during continued operation of the wiper in its movement to the right as viewed in Fig. 6, does not move completely up to the right hand end wall of the cylinder 56 but stops short thereof by an amount such as that indicated in Fig. 6. The purpose of this feature will be brought out later.

In order to control the operativeness of the wiper, in other words, to cause it to operate or to prevent it from operating, the following mechanism is provided. As indicated in Fig. 5, the rear open face of the pocket 69 is sealed by a cover 150 suitably secured to the body 54 as by means of screws 152. A shaft 154 rotatably journaled in the cover 150 projects therethrough in axial alignment with the operating shaft 34. Exteriorly of the cover 150 the shaft 154 is provided with a manually engageable lever 156. Within the pocket 69 a plate member 158, best shown in Figs. 5, 7 and 8, is fixed to the shaft 154, its hub portion being received within the curved portion 144 of the arm 142, the arm 142 being curved at this point for clearance of this part. As best indicated in Figs. 7 and 8, the plate 158 has pivoted thereto as by means of a screw 160, a latch bar or arm 162 which is constantly urged toward a predetermined position in a counter-clockwise direction of movement as viewed in Figs. 7 and 8 by means of a spring 164. Further movement of the arm 162 in such direction is limited by contact of one end of the arm 162 with the anchored end of the spring 164. The latch arm 162 longitudinally overlaps the rearwardly extending end of the pin 120, as indicated in Fig. 5, and when the lever 156 is in the position indicated in Figs. 5 and 7 the upper end of the latch arm 162 is positioned slightly below the normal path of movement of the pin 120 during oscillation of the arm 96 when the wiper is being operated. When the lever 156 is in the position indicated in Figs. 5 and 7 the rearwardly extending end of the pin 120 thus freely passes over the upper end of the latch arm 162 and is unmolested in movement thereby. If, however, it is desired to stop the oscillation of the wiper, the arm 156 is moved to the position indicated in Fig. 8 which causes the plate member 158 to be swung about the axis of the shaft 154 and which thus raises the extending end of the latch arm 162 up to a position where it intersects the path of movement of the pin 120. If at such time the upper end of the arm 96 is in its left hand position of movement as viewed in Figs. 5, 6 and 9, the pin 120 will be engaged by the end of the latch arm 162, as indicated in Fig. 8, which will thus prevent it from being returned by tension of the spring 148. If, however, the arm 96 is in the position indicated in Fig. 4, for instance, as soon as the gear segment 70 has oscillated through a sufficient angle to again bring the notches 126 in the cam 124 into alignment with the pin 120, the pin 120 will be projected by the spring 148 to its left hand limit of position, as indicated in Fig. 9, and, in moving to such position, will ride over the projecting end of the latch arm 162, which will yield under the force of the spring 164 to permit this, but will be prevented thereby from returning to its opposite limit of movement. Accordingly, when the arm 96 is thus held by the latch arm 162 in the position indicated in Fig. 9, the passage 106 for the oil under pressure will be connected with the outer or left hand end of the cylinder 56, as viewed in Figs. 6 and 9, while the inner end of the cylinder 56 will be connected with the discharge passage 108 and the valve will be maintained in this position. When this occurs the piston 64 will be caused to move to the full extent of its travel in a direction toward the right as viewed in Figs. 6 and 9. This will cause the operating shaft 34 to move to a greater degree of angular movement than it moves through during ordinary operation of the wiper and such as to cause the arm 36 and wiper blade 38 to be thrown up into a substantially horizontal position adjacent the upper edge of the windshield 28 where it will be substantially concealed or at least will be out of the position where it may interfere with the clear vision of the vehicle operator. Should it be desired to again resume operation of the wiper, the lever 156 is simply returned to the position indicated in Fig. 7, which will thus draw the latch arm 162 out of contact with and out of the path of movement of the pin 120 and will permit the spring 148 to return the arm 96 and valve 90 to a position to again cause the piston 64 to be moved toward the outer limit of its stroke, after which normal operation of the wiper will continue until it is stopped in the manner above described.

It will, of course, be understood by those skilled in the art, that where a device of the type described, obtains motive power from the lubrication system of an internal combustion engine, that where the lubricating fluid or oil of such system is cold it becomes relatively heavy and viscous, and in such case if no provisions were made to compensate for this condition, the oil would tend to flow slowly through the connections to and from the wiper motor and through the various passageways in the wiper motor and would result in the wiper arm having a relatively slow stroke. Conversely, if the lubricating oil in the engine became heated and therefore thinned out, it would tend to flow more rapidly through the wiper and cause the arm to oscillate at a considerably greater speed.

Provisions are made, as a further phase of the present invention, for compensating for the changes in the characteristics of the lubricating oil to changes in the temperature thereof and so as to obtain a substantially constant rate of oscillation of the wiper arm regardless of the temperature of the lubricant employed for moving it, as well as compensating to a great degree for the variations of pressure on the oil at different speeds of operation of the engine.

Referring particularly to Figs. 6 and 16, it will be noted that a member or element 170, of bimetallic construction such as is commonly employed for producing thermostats, is anchored at one end by means of a screw 172 to the body 54 within the pocket 84 in the small housing 76, and is bent into a loop so as to bring the other or free end thereof into alignment with the end of the opening 106 opening into the pocket 84. This latter end of the thermostatic element 170 is provided with a frusto-conical member 174 having a relatively small central orifice 176 therethrough. The frusto-conical member 174 is adapted to engage the open end of the passage 106 under certain conditions of operation and serve in the nature of a valve therefor, thus limiting the effective capacity of the passage 106 to the capacity of the orifice 176.

The element 170 is so shaped that when the temperature of the lubricating oil in the pocket 84 is below a predetermined value, the member 174 will be withdrawn from contact with the end edges of the passage 106 in the manner illustrated in Fig. 16 so that oil may flow from the pocket 84 into the passage 106 around the exterior of the member 174 as well as through the orifice 176. The temperature at which the element 170 moves the member 174 away from engagement with edges of the opening 106 corresponds, of course, to such temperatures of the lubricating oil as cause it to have a relatively high viscosity. Means such as a strip 177 secured to the body 54, is preferably provided for limiting the movement of the member 174 in its opening movement. As the engine heats up and the temperature of the lubricating oil increases, the oil in flowing through the pocket 84 will increase the temperature of the element 170 to a predetermined point at which the element 170 will start to open its loop-like form and move the member 174 toward the end edges of the passageway 106, and when the temperature of such oil in the pocket 84 reaches a predetermined high temperature, the element 170 will have moved the member 174 into firm engagement with the end edges of the passageway 106 and thereafter will restrict the flow of oil from the pocket 84 to the passageway 106 to the orifice 176 only.

The orifice 176 is made of such dimensions that when the lubricating oil of the engine is at ordinary operating temperature and the vehicle is traveling at a medium rate of speed, the wiper will have a substantially predetermined number of strokes per minute, preferably in the neighborhood of 40. It has also been found that where the size of the orifice 176 is properly proportioned, increase in the pressure of oil in the lubricating system above the value normally obtained at medium engine speed has very little effect on increasing the flow of lubricant through the orifice 176, and consequently the rate of oscillation of the wiper arm does not increase in proportion to the increase of pressure in the lubricating system at higher engine speeds. This, of course, is of advantage in that it tends to maintain a substantially constant rate of oscillation of the wiper arm over relatively wide range of speeds of the vehicle on which the wiper motor is mounted. At engine idling speed and speeds slightly thereabove, the rate of oscillation of the wiper arm is, of course, decreased from the desired constant rate, but inasmuch as the necessity of clear vision is less at such periods of operation, and due to the fact that but a small proportion of travel of the motor vehicle occurs at such speeds, this has not been found to constitute any material disadvantage.

It will be noted that no packing whatsoever is provided in the above described windshield wiper motor structure and that leakage of the motor fluid must necessarily occur along the piston rod 66 into the pocket 69. Shaft packings would, of course, necessarily increase the expense of the structure and, at the same time, would decrease the efficiency thereof because of the added friction set up thereby. In accordance with a further phase of the invention and employed particularly where the windshield wiper motor is operated by a liquid under pressure, the following means are provided for preventing such accumulations of leakage of the motive liquid in the pocket 69 as would permit its leakage from the wiper motor itself.

Again referring to Fig. 6, it will be noted that the piston rod 66 is enclosed by the body 54 except at a position under the gear sector 70 where it is cut away to permit engagement of the gear sector 70 with the gear rack 68, and also except for a notch or passageway 180, best shown in Figs. 6, 9 and particularly Fig. 14, which connects the lower portion of the pocket 69 with the undersurface of the bore 58 in which the piston rod 66 is reciprocable. This notch 180 is so located that when the piston 64 is at its extreme left-hand position of movement, as viewed in Fig. 6 for instance, the right-hand end of the piston rod 66 will have moved to the left-hand extremity of the notch 180. If at this point of operation of the wiper motor there is any accumulation of motive liquid in the pocket 69 above the level of the lower surface of the piston rod 66, it will tend to flow through the notch 180 into the bore 58 between the notch 180 and the plug 62. Under such circumstances, it will be apparent that upon the next stroke of the piston 64 and piston rod 66 to the right, such liquid will be placed under a compressive force in the bore 58 between the right-hand end of the piston rod 66 and the plug 62. Advantage is taken of this feature, as best indicated in Figs. 6 and 15, by providing an opening 182 connecting the extreme right-hand end of the bore 58 with the discharge passage 108. The opening 182 is reduced as at 184 to provide a shoulder against which a ball check valve 186 is constantly urged by a spring 188, thus permitting the flow of liquid only in the direction from the bore 58 to the passageway 108. Consequently, when any liquid in the pocket 69 flows into the bore 58, beyond the end of the piston rod 66, and is placed under a compressive force upon the next ensuing stroke of the piston rod 66, it will be forced through the opening 182 into the discharge passage 108 and thus will be forced out of the wiper motor. Accordingly, it will be apparent that the above described structure provides an auxiliary pump for forcibly ejecting any excess motive liquid from the interior of the wiper motor. At the same time it may be noted that this structure also provides in effect a stand pipe for maintaining a predetermined level of liquid in the pocket 69 and that such level is sufficient to cause effective lubrication of the parts within the pocket 69 during all phases of operation.

It will also be apparent that when the arm 166 is moved to a position to prevent operation of the wiper, while the engine is running oil under pressure is being applied to the face of the piston 64 in order to maintain it in its inoperative position, and that at such time a small amount of leakage is liable to occur from the cylinder 58 into the pocket 69 and, further, that the means previously described for forcibly ejecting excess leakage from the pocket 69 will not operate at such time to take care of such leakage. Accordingly, in accordance with a further phase of the present invention, the following means are provided for such contingency.

As indicated best in Figs. 6, 9 and particularly Fig. 13, it will be noted that an opening 190 communicates the bore 58 with the discharge passage 108, the passage 190 at the point where it joins the bore 58 being to the left of the notch 180, as viewed in the figure, and in fact at the area where the body 54 is cut away for engagement of the gear sector 70 with the gear rack 68. The opening 190 is reduced in diameter at its upper end to form a seat or shoulder against which a ball valve 191 is adapted to seat. The body 54 is provided with a notch 192 in transverse alignment with the opening 90 as best indicated in Fig. 13, which affords open communication between the upper reduced end of the opening 190 and the interior of the pocket 69. A plug 193 closes the lower or open end of the opening 190 and is provided with an axially projecting pin 194 which extends into spaced but adjacent relation to the ball 191 when the latter is in seated relation.

When the wiper motor is operating and a material flow of oil is passed out through the discharge passage 108, unless the discharge side of the wiper is connected to the suction side of the pump, then a back pressure develops in said passage which tends to force some of the oil from the passage 108 through the opening 190 and into the pocket 69. When such tendency is exerted the flow of oil through the opening 190 causes the ball 191 to seat and shut off the flow to the pocket, the back pressure holding the ball in place when once seated. If, however, the wiper motor is stopped, either by the control lever 156, by stoppage of the engine or by breakage of the spring 148 for instance, the back pressure on the oil in the passage 108 will drop to atmospheric pressure at which time the ball 191 will drop away from its seat by gravity and provide free communication between the pocket 69 and discharge passage 108 through which any excess oil in the pocket 69 may drain back to the crank case of the engine 22. At the same time it will be apparent that this structure also serves in effect as a standpipe for maintaining the desired level of liquid in the pocket 69 during those periods when the wiper is not functioning.

In those climates or locations where motor vehicles are operated at temperatures at which frost or ice is liable to form on the windshield of motor vehicles, and thereby render the operation of the vehicle to become more dangerous than usual under such conditions, it is of course desirable to provide some means for the elimination of such frost or ice. In accordance with a further phase of the present invention, when the wiper motor is operated by lubricating oil in the engine of the motor vehicle, advantage is taken of this fact to provide means for elimination of frost or ice on the windshield by warming an area thereof.

The lubricating oil which is fed to the windshield wiper motor from the internal combustion engine in order to cause operation thereof becomes relatively warm after the engine has had an opportunity to warm up, and yet the temperature of the oil seldom, if ever, reaches a temperature sufficiently high to be dangerous for the purpose hereinafter contemplated.

As best indicated in Figs. 2 and 17, the tube 48 which conveys the lubricating oil to the wiper motor, at a desired point in the width of the windshield 28 and which may, for instance, be in the direct vertical alignment with the line of the vision of the vehicle operator, is looped downwardly from the upper edge of the windshield and then across it for a short distance and then back upwardly to a preferably concealed position. A pad 196, preferably formed from some material having a relatively high coefficient of heat conductivity such as aluminum and having a flat front face adapted to bear against a material area of windshield 28, is clamped to the looped portion of the tube 48 by means of a clamping member 198 and screws 200, the pad 196 and clamp 198 preferably being so formed as to provide a maximum area of contact between the exterior surface of the tube 48 and themselves so as to permit a maximum amount of heat interchange between them. Preferably, a spring arm such as 202 as indicated in Figs. 1 and 2, is employed between the windshield header 30 and clamp 198 for the purpose of pressing the flat forward face of the pad 196 into firm contact with the rear face of the windshield 28. As will be apparent, with this construction the heat in the lubricating oil passing through the tube 48 will be absorbed by the pad 196 and the windshield 28 will absorb the heat from the pad 196 and will thus cause an area of the windshield 28 to be heated so as to maintain its temperature at a point sufficiently high to prevent the formation of frost or ice thereon. This arrangement provides an efficient, effective and economical means of guarding against total obstruction of the vision of the vehicle operator through the windshield of the vehicle, and is claimed in Patent No. 2,056,776 granted on application Serial No. 722,738, filed April 27, 1934, as a division of the present application.

Although one embodiment of the present invention is shown in the accompanying drawings and described in the foregoing specification, it will be apparent that certain features thereof are capable of independent use and that various modifications and changes may be made in the various parts and features of the structure and, accordingly, it will be understood that formal changes may be made in the specific embodiment of the invention described without departing from the spirit or substance of the broad invention, the scope of which is commensurate with the appended claims.

We claim:

1. In a windshield wiper motor actuated by a fluid under pressure, in combination, a body having a pair of cylinders, one of which is a working cylinder, connected pistons in said cylinders, means for reciprocating the piston in the working cylinder, said body being formed with a pocket therein adapted to receive fluid leaking from the working cylinder and to drain such leakage into the other cylinder, and means permitting discharge of fluid compressed in said other cylinder.

2. In a windshield wiper motor, in combination, a body providing a pocket, a working cylinder and a pumping cylinder, pistons in said cylinders operatively connected together, said pocket adapted to receive fluid leaking from said working cylinder, and a connection between said pumping cylinder and said pocket for forcibly ejecting excess fluid from said pocket.

3. In a windshield wiper motor, in combination, a body having a cylinder formed therein and a bore concentric with and communicating with said cylinder, a piston reciprocable in said cylinder, a piston rod fixed to said piston and reciprocable in said bore, said body having a pocket formed therein for receiving fluid leaking from said cylinder, means effecting open communication between said bore and said pocket when said motor is not operating, and a valve controlling a discharge port leading from said bore.

4. In a windshield wiper motor, in combination, a body provided with a pocket, a cylinder and a bore communicating with said cylinder, a piston in said cylinder having a rod slidably received in said bore, the end of said bore opposite said piston being closed, a rotatable shaft projecting into said pocket, a rack movable with said rod, a gear sector on said shaft in mesh with said rack, said body having an inlet and a discharge passage for said cylinder, valvular means for alternately connecting said passages to opposite ends of said cylinder, said body having a passageway therein providing communication between said bore and said pocket and so controlled as to permit a free flow of fluid from said pocket to said bore only when no back pressure exists in said discharge passage, said body also having a passageway connecting said bore with said discharge passage, and a one way valve in the last mentioned passage.

5. In a windshield wiper motor, in combination, a body having a pocket and a cylinder formed therein, a piston reciprocable in said cylinder, a rod for said piston reciprocable therewith, a rotatable shaft, means operatively connecting said shaft to said rod for inter-related movement, said body being provided with an inlet and a discharge passage for said cylinder, valvular means for alternately connecting opposite ends of said cylinder with said inlet and said discharge passage whereby to cause said piston to reciprocate between predetermined limits of movement, means for limiting communication between said cylinder and said intake passage to one end of said cylinder only whereby to cause said piston to move beyond its normal limit of movement in one direction, and said body and said rod being provided with communicating passages affording a free communication between said pocket and said discharge passage when said wiper is not operating.

6. A fluid motor comprising, in combination, a body having a passage for the flow of a fluid working medium opening upon a face thereof, said body having a pocket formed over the end of said passageway, a thermostatic element within said pocket, a member carried by said thermostatic element and movable under the influence thereof into a position to throttle said passageway, said member having an orifice therethrough permitting a limited flow of fluid through said member when said member is in its passageway throttling position.

7. A fluid motor comprising, in combination, a body having a passageway therein for communicating a source of working fluid with said motor and a part to be adapted to be actuated by said fluid, a housing removably secured to said body and including a passageway in communication with the first mentioned passageway and valves controlling the flow of fluid through said passageway, a tube connecting said housing with a source of working fluid, said body and operating parts carried thereby including said part and said valves being removable from said housing without disturbing the connection between said tube and said housing.

8. A fluid motor comprising, in combination, having an inlet and an outlet passage for a working fluid and a part to be actuated by said fluid, a housing secured to said body and provided with a pair of passages therein in communication with the first mentioned passages and valve mechanism controlling the flow of fluid through said passages, a pair of tubes connected to said housing one of which is in communication with a source of working fluid, said body with said part and said mechanism being removable as a unit from said housing without disturbing the position of said housing or its connection with said tubes.

9. In a windshield wiper motor including an oscillatable shaft and an oscillatable valve, a lever fixed to said valve for oscillation therewith, an arm fixed to said shaft for oscillation therewith, spring means connecting said lever and said arm, and manually controllable means movable into intersecting relation with respect to the path of movement of said lever whereby to prevent its operation under the influence of said spring including a spring pressed latch arm yieldable under the influence of said lever during movement of said lever in one direction only.

10. In combination with a windshield wiper motor having a pocket adapted to be partially filled with a liquid seeping thereinto from an operating part of said motor, an oscillatable snap action valve having an end projecting into said pocket, means for oscillating said valve, and a dash pot having a pocket adapted to be partially filled with liquid and an arm operating in said pocket and associated with said valve for cushioning the limiting movements thereof.

11. In combination with a windshield wiper motor having a pocket adapted to be partially filled with a liquid, an oscillatable snap action valve for controlling the operation of said wiper, a dash pot positioned below the level of liquid in said pocket and adapted to receive liquid therefrom, and means connecting said valve with said dash pot for cushioning the limiting movement thereof.

12. In a windshield wiper motor, in combination, a body having a pocket formed therein, an oscillatable valve snap action for controlling the operation of said motor having an end projecting into said pocket, means for causing oscillation of said valve, a segmental auxiliary pocket formed within the first mentioned pocket, means connected with said valve projecting into said segmental pocket and adapted to limit oscillation of said valve by engagement with opposite ends of said segmental pocket.

13. In a windshield wiper motor, in combination, a body having a pocket formed therein, an oscillatable snap action valve for controlling the operation of said motor having an end projecting into said pocket, means for causing oscillation of said valve, a segmental auxiliary pocket formed within the first mentioned pocket, means connected with said valve projecting into said segmental pocket and adapted to limit oscillation of said valve by engagement with opposite ends of said segmental pocket, said means fixed to said valve and projecting into said segmental pocket providing a dash pot for cushioning the limiting movement of said valve.

14. In a windshield wiper motor, in combination, a body providing a cylinder, a piston reciprocal therein, a gear segment disposed tangentially adjacent the axis of said cylinder, an oscillatable shaft connected to said piston and operatively engaging said gear for imparting to said gear a limited rotation, an oscillatable valvular means for controlling the admission of fluid to opposite ends of said cylinder for actuating said piston, an arm having a projection thereon fixed to said valvular means for oscillation therewith, an arm fixed to said gear for oscillation therewith, spring means connecting the free ends of said arms, and cam means integral with said gear segment so disposed as to be movable into a normally intersecting relation with respect to the path of movement of said projection on said valvular means arm, said cam having a transverse path upon its face permitting said projection to pass therethrough only when said cam is in either one of two positions attained through the rotatable movement of said gear segment, said positions being predetermined and said cam adapted to occupy same only when said piston is in either one of its advanced positions.

15. In a windshield wiper motor, in combination, a casing providing a cylinder, a piston reciprocable in said cylinder, valve means in said casing for controlling the admission and discharge of a fluid under pressure to and from opposite ends of said cylinder, a member arranged for automatic oscillation by said piston between two limits of movement during reciprocation thereof, an arm fixed to said valve means for oscillation therewith, an arm having a projection thereon secured relative to said member for oscillation therewith, spring means connecting the free ends of said arms, and cam means connected to said member to oscillate therewith and so disposed as to be movable into a normally intersecting relation with respect to the path of movement of said projection upon said valve means arm, said cam having a path upon its face permitting said projection to pass therethrough and the valve arm thereby to oscillate only when said cam is in either one of two positions attained through an oscillation accompanying the oscillation of said member, said positions being predetermined and said cam adapted to occupy the same only when said piston is in either one of its advanced positions.

16. In a windshield wiper motor including an oscillatable shaft and an oscillatable valve, a lever fixed to said valve for oscillation therewith, an arm fixed to said shaft for oscillation therewith, spring means tensioned between said lever and said arm, manually movable means automatically operable when brought to an operating position to interrupt movement of said lever in one direction, said means being ineffective to interrupt movement of said lever in the other direction.

17. In a windshield wiper motor including an oscillatable shaft and an oscillatable valve, a lever fixed to said valve for oscillation therewith, an arm fixed to said shaft for oscillation therewith, spring means tensioned between said lever and said arm, and manually controllable means movable into intersecting relation with respect to the path of movement of said lever whereby to prevent its operation under the influence of said spring in one direction, said means being ineffective to interrupt movement of said lever in the other direction.

18. In a windshield wiper motor including an oscillatable shaft and an oscillatable valve, a lever fixed to said valve for oscillation therewith, an arm fixed to said shaft for oscillation therewith, spring means connecting said lever and said arm, and manually controllable means movable into intersecting relation with respect to the path of movement of said lever whereby to prevent its operation under the influence of said spring including a means yieldable under the influence of said lever in one direction and not yieldable in the other direction during the movement of said lever.

19. A windshield wiper motor comprising, in combination, a housing having a central body portion and first and second end portions positioned at opposite sides respectively of said central portion, an operating cylinder formed in one of said end portions and a piston reciprocable in said cylinder, a shaft rotatably mounted in said central body portion, means forming a driving connection between said piston and said shaft, a fluid pressure supply line connected into said other end portion, and valve mechanism positioned within said housing intermediate said first and second end portions for controlling the transmission of fluid pressure between said supply line and said chamber.

20. A windshield wiper mechanism comprising, in combination, a wiper; a fluid pressure motor having a movable vane; means for subjecting said vane to fluid under pressure to cause it to operate the wiper back and forth between predetermined first and second limit positions; and a selectively operable parking device pre-settable to control said means to cause said wiper to stop and remain at rest adjacent said first limit position, said parking device being ineffective to cause said wiper to stop at said second limit position, and having no effect upon said means until the approach of said wiper to said first limit position.

21. A windshield wiper mechanism, comprising in combination, a wiper, a fluid pressure motor having a part movable to operate the wiper back and forth between predetermined first and second limit positions, and a selectively operable parking device operable regardless of the position or direction of movement of said wiper and effective to cause said wiper to stop and remain at rest adjacent said first limit position upon its arrival thereat, said parking device being ineffective to control said wiper at said second limit position and having no effect upon said wiper until the approach thereof to said first limit position.

22. A windshield cleaning mechanism comprising, in combination, a wiper, a fluid pressure motor having a part movable to operate the wiper back and forth between first and second limit positions, automatic valve mechanism adapted to reverse the application of power to said part as said part approaches said limit positions, and a selectively operable parking device for preventing said automatic valve mechanism from operating as said wiper reaches said first limit position, said parking device being ineffective to control said valve mechanism as said wiper approaches said second limit position.

23. Windshield wiper mechanism, comprising, in combination a wiper, a fluid pressure operated motor having a part movable to operate the wiper back and forth between first and second limit positions, automatic valve mechanism adapted to reverse the application of power to said part as said wiper successively approaches said limit positions, a selectively operable parking device for preventing operation of said valve mechanism as said wiper approaches said first limit position, said parking device being ineffective to control said automatic valve mechanism as said wiper approaches said second limit position, and a pre-setting means for said parking device operable regardless of the position or direction of movement of said wiper.

24. Windshield wiper mechanism comprising, in combination, a wiper, drive means for moving said wiper back and forth between first and second limit positions, and means for controlling said drive means including a device operable at any time during the travel of said wiper, regardless of the position or direction of travel thereof, for causing said wiper to stop and remain at rest in a parked position adjacent said first limit of travel, said parking device having no effect upon said wiper until the approach thereof to said first limit position.

25. Windshield wiper mechanism comprising, in combination, a wiper, drive means for operating said wiper back and forth between first and second limit positions, and parking means for controlling said drive means including a device operable at any time during the travel of said wiper, regardless of the position or direction of travel thereof, to cause said wiper to stop at a parking position at one side of and beyond said normal operating range, said parking means having no effect upon said wiper until the approach thereof to said parking position.

26. Windshield wiper mechanism comprising, in combination, a wiper, a fluid pressure motor having a part movable to operate said wiper back and forth over a predetermined operating range, automatic valve mechanism adapted to reverse the application of power to said part as said wiper successively reaches the limits of said operating range, and a selectively operable parking device for preventing operation of said automatic valve mechanism and for causing said wiper to move to and remain at rest at a parking position beyond and at one side of said operating range, said parking device being operable at any time during the travel of said wiper regardless of the position or direction of travel thereof, and being ineffective to control operation of said valve mechanism in the other end of travel of said wiper.

ROBERT B. EVANS.
EARL W. DILG.
GEORGE GERMANN.